3,178,417
PROCESS FOR THE MANUFACTURE OF
1-DEHYDRO-STEROIDS
Albert Wettstein, Riehen, Georg Anner, Basel, Charles
 Meystre, Reinach, Basel-Land, and Jaroslav Kalvoda,
 Basel, Switzerland, assignors to Ciba Corporation, New
 York, N.Y., a corporation of Delaware
No Drawing. Filed Dec. 31, 1962, Ser. No. 248,303
Claims priority, application Switzerland, Jan. 19, 1962,
660/62
18 Claims. (Cl. 260—239.55)

The present invention provides a novel process for the manufacture of 1-dehydrosteroids, more especially of $\Delta^1$-1:11α-oxidosteroids and $\Delta^1$-11α-hydroxysteroids, starting from 1-unsubstituted 11α-hydroxysteroids that are saturated in position 1. According to the present process 11α-hydroxysteroids that are both saturated and unsubstituted in position 1 are treated with compounds forming monovalent, positive iodine. The reaction according to the invention can be represented by the following example:

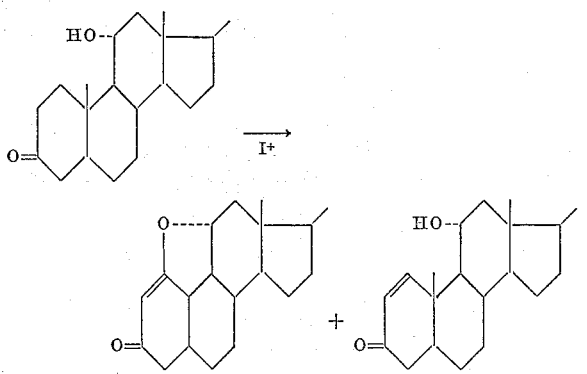

As can be seen, the treatment of the starting material with a compound forming monovalent, positive iodine produces, on one hand, the partly known $\Delta^1$-11α-hydroxysteroids and, on the other, new $\Delta^1$-1:11α-oxidosteroids, the latter being obtained in a preponderant amount. Accordingly, the present invention includes also this new group of $\Delta^1$-1:11α-oxidosteroids which possess valuable pharmacological properties or may be used as intermediates in the manufacture of physiologically active compounds. Thus, for example, this $\Delta^1$-1:11α-oxidosteroids of the androstane series—more especially those which contain an oxo group in position 3, and a 17β-hydroxy group and which may be substituted in position 17α by a saturated or unsaturated aliphatic hydrocarbon residue and/or may have further double bonds, e.g., in the 4-position, display an advantageous ratio of anabolic-to-androgenic action and inhibit the secretion of gonadotropin. Consequently, they may be used as anabolic medicaments and as ovulation inhibitors. The corresponding 21-unsubstituted 3,20-dioxo-pregnane derivatives are pure gestagens. If a resulting 1-dehydro-1:11α-oxido-steroid does not contain the afore-mentioned substituents such, for example as the 3-keto group or a hydrocarbon residue in position 17α, such substituents can be introduced or formed in known manner. Thus for example, a hydroxyl group in position 3 may be dehydrogenated in known manner to form an oxo group. The $\Delta^1$-11α-hydroxysteroids which are likewise formed by the present process have the same properties as the $\Delta^1$-1:11α-oxidosteroids referred to above.

Both the $\Delta^1$-3-oxo-1:11α-oxidosteroids and the $\Delta^1$-3-oxo-11α-hydroxysteroids are suitable as intermediates for the manufacture of known, physiologically active 1-dehydrosteroids. Thus, for example, starting from $\Delta^1$-3-oxo-11α-hydroxysteroids that contain an additional double bond in position 4:5 it is possible to obtain by known methods the known, highly active corticoids of the type of prednisolone, or androgens and anabolics of the type of 1-dehydrotestosterone and its derivatives. The $\Delta^1$-3-oxo-1:11α-oxidosteroids in their turn can be converted into the afore-mentioned $\Delta^1$-3-oxo-11α-hydroxysteroids, for example by hydrogenating the double bond and subsequent treatment with a base or acid (for example with an alkali metal acylate such as those of araliphatic acids, such as sodium acetate or potassium acetate, or with carbonates or bicarbonates of alkali metals or alkaline earth metals, such as the carbonate or bicarbonate of sodium or potassium, or strontium carbonate, or with a hydroxide of an alkali metal or alkaline earth metal such as sodium hydroxide, potassium hydroxide or barium hydroxide, or by adsorption on active alumina). As acids there are used organic or inorganic acids such as formic, acetic, propionic, trifluoroacetic, para-toluenesulfonic, sulfuric hydrochloric, perchloric acid or boron trifluoride or the like, preferably in a suitable diluent, such as a lower aliphatic alcohol, for example in methanol or ethanol, in a hydrocarbon, for example in benzene, or in an ether, for example in dioxane.

Finally, a resulting $\Delta^1$-3-oxo-11α-hydroxysteroid may be used for the manufacture of the known 11-unsubstituted $\Delta^1$-3-oxosteroids that contain no double bond in position 4:5, for example for the manufacture of such physiologically active compounds of the androstane series. For this purpose the 11-hydroxy compound is converted into an 11-sulfonyl ester thereof (for example a tosylate), which latter is then reduced with a complex metal hydride, for example with lithium aluminium hydride, and the 3-hydroxyl group formed is then oxidised to the oxo group.

As starting materials for the present process there are suitable 11α-hydroxysteroids, more especially those of the androstane, 19-norandrostane, pregnane and 19-norpregnane series, which may contain further substituents in one or several of the positions 3–8, 12, 14–18, 20 and 21, such as free or functionally converted oxo groups (ketals; enol derivatives), protected hydroxyl groups such as acyloxy or alkoxy groups, saturated or unsaturated hydrocarbon residues, or halogen atoms. Furthermore, they may contain additional double bonds, for example starting from carbon atom 5, and oxido groups.

Particularly suitable starting materials are saturated or unsaturated 3-oxo compounds, for example:

3:17-dioxo-11α-hydroxy-5α-androstene,
3:17-dioxo-11α-hydroxy-5β-androstene,
3-oxo-11α-hydroxy-17α-acyloxy-5α- and -5β-androstanes,
3-oxo-11α-hydroxy-17β-acyloxy, 17α-alkyl-, -alkenyl- and alkinyl-androstanes, such as
3-oxo-11α-hydroxy-17β-acyloxy-17α-methyl-, 17α-ethyl-, -17α-vinyl-, -17α-ethinyl- and -17α-chlorethinyl-androstanes; also
3:29-dioxo-11α-hydroxy-5α- and -5β-pregnanes and their 20-ethyleneketals,
3:20-dioxo-11α-hydroxy-17α-acyloxy-5α- and -5β pregnanes,
3:20-dioxo-11α-hydroxy-21-acyloxypregnanes; and also
$\Delta^4$-3:17-dioxo-11α-hydroxyandrostene,
$\Delta^4$-3-oxo-11α-hydroxy-17β-acyloxyandrostens,
$\Delta^4$-3-oxo-11α-hydroxy-17β-acyloxy-17α-alkylandrostenes, -17α-alkenylandrostenes and -17α-alkinylandrostenes, for example:
$\Delta^4$-3-oxo-11α-hydroxy-17β-acyloxy-17α-methyl-, -17α-ethyl, -17α-vinyl- and -17α-ethinylandrostenes,
$\Delta^4$-3:20-dioxo-11α-hydroxypregnene,
$\Delta^4$-3:20-dioxo-11α-hydroxy-21-acyloxypregnenes and their 20-ethyleneketals.

These 11α-hydroxy compounds used as starting materials are reacted according to the invention with compounds forming monovalent, positive iodine. Such compounds are, for example, N-halocarboxylic acid amides and imides, for example N-iodosuccinimide or N-chloracetamide, N-bromacetamide, N-chlorosuccinimide, N-bromosuccinimide and 1:3-dibromo-5:5-dimethylhydantoin, in the presence of iodine. It is of special advantage to use derivatives of hypoiodous acid, for example alkylhypoiodites, which can be prepared, for example, from heavy-metal oxides such as mercury oxide, silver oxide, lead oxide or the like with iodine and alcohols. Particularly high yields of $\Delta^1$-steroids are obtained by using acylhypohalites which are advantageously prepared from heavy-metal acylates, for example acetates, propionates, trifluoroacetates or benzoates of metals of sub-group I or II of the Periodic Table, for example from silver acylates and mercury acylates, and iodine. An advantageous method of making the acylhypoiodites is the reaction of iodine with lead tetraacylates, whereby lead diacylates and acylhypoiodites are formed. Monovalent, positive iodine is also present in compounds of iodine with other halogens, that is to say in iodine chloride or iodine bromide. It is of advantage to manufacture the iodine reagent used, more especially the acylhypoiodites, directly in the reaction solution in the manner described above.

The process may be performed for example in the following manner: The starting material is dissolved or suspended in a solvent that is inert towards the oxidant, for example in a hydrocarbon such as hexane, cyclohexane, methylcyclohexane or in a halogenated hydrocarbon such as carbon tetrachloride or in methylene chloride; lead tetraacetate, iodine and if desired a weak base, for example calcium carbonate, are then added, and the reaction mixture is stirred and heated under atmospheric or superatmospheric pressure, whereupon the precipitated products are purified by crystallisation or optionally by chromatography. In an analogous manner the reaction can be carried out with iodine and silver acylates or with iodine and mercury acylates, for example acetates, or with the complexes formed from said reagents. The time taken by the reaction depends on the temperature and/or the solvent and the reagent forming positive iodine used. When the reaction is performed with lead tetraacetate and iodine in boiling cyclohexane the reaction is complete as a rule after 30 to 75 minutes. The reaction of the invention can be accelerated by irradiating the reaction mixture with visible and/or ultra-violet light.

From among the new $\Delta^1$-3-oxo-1:11$\alpha$-oxidosteroids obtained by the present process the following deserve special mention:

$\Delta^1$-3-oxo-1:11$\alpha$-oxido-steroids of the androstane and pregnane series of the formula

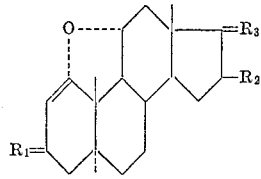

wherein $R_1$ is a hydroxyl group, an acyloxy group or an etherified hydroxyl group together with a hydrogen atom or a free or ketalized oxo group, $R_2$ is a hydrogen atom or a lower alkyl group and $R_3$ is an oxo group, a $\beta$-hydroxyl group or $\beta$-acyloxy group together with a hydrogen atom or a lower aliphatic hydrocarbon residue, or a $\beta$-acetyl, a free or esterified $\beta$-hydroxyacetyl group together with a hydrogen atom or a free or esterified hydroxyl group, as well as their 5$\beta$-isomers and derivatives having a double bond extending from the 5 carbon atom, $\Delta^1$-3:17-dioxo-1:11$\alpha$-oxido-5$\alpha$- and -5$\beta$-androstene,
$\Delta^1$-3-oxo-17$\beta$-hydroxy-1:11$\alpha$-oxidoandrostene and its esters,
$\Delta^1$-3-oxo-17$\beta$-hydroxy-17$\alpha$-alkyl-, -17$\alpha$-alkenyl- and -17$\alpha$-alkinyl-1:11$\alpha$-oxidoandrostenes and their esters such, for example, as:
$\Delta^1$-3-oxo-17$\beta$-hydroxy-17$\alpha$-methyl-, -ethyl-, vinyl- and -ethinyl-1:11$\alpha$-oxidoandrostene and their esters; also
$\Delta^1$-3:20-dioxo-1:11$\alpha$-oxido-5$\alpha$- and -5$\beta$-pregnene,
$\Delta^1$-3:20-dioxo-17$\alpha$-hydroxy-1:11$\alpha$-oxido-5$\alpha$- and -5$\beta$-pregnene and their esters,
$\Delta^1$-3:20-dioxo-21-hydroxy-1:11$\alpha$-oxido-5$\alpha$- and -5$\beta$-pregnene and their esters; also
$\Delta^{1:4}$-3:17-dioxo-1:11$\alpha$-oxidoandrostadiene,
$\Delta^{1:4}$-3-oxo-17$\beta$-hydroxy-1:11$\alpha$-oxidoandrostadiene and its esters,
$\Delta^{1:4}$-3-oxo-17$\beta$-hydroxy-17$\alpha$-alkyl-, -17$\alpha$-alkenyl- and -17$\alpha$-alkinyl-1:11$\alpha$-oxidoandrostadiene and their esters, for example:
$\Delta^{1:4}$-3-oxo-17$\beta$-hydroxy-17$\alpha$-methyl-, -17$\alpha$-ethyl-, -17$\alpha$-vinyl-, -17$\alpha$-ethinyl-, -17$\alpha$-chlorethinyl-1:11$\alpha$-oxidoandrostadiene and their esters, and
$\Delta^{1:4}$-3:20-dioxo-1:11$\alpha$-oxidopregnadiene,
$\Delta^{1:4}$-3:20-dioxo-17$\alpha$-hydroxy-1:11$\alpha$-oxidopregnadiene and its esters,
$\Delta^{1:4}$-3:20-dioxo-21-hydroxy-1:11$\alpha$-oxidopregnadiene and its esters.

In the above-mentioned esters the acid residues are more especially those of aliphatic, cycloaliphatic, araliphatic, aromatic or heterocyclic carboxylic acids with 1 to 15 carbon atoms, for example formates, acetates, propionates, butyrates, trimethylacetates, caproates, valerates, oenanthates, decanoates, cyclopentylpropionates, hexahydrobenzoates, phenylpropionates, benzoates, furoates, trifluoroacetates, ethylcarbonates, methylcarbonates and the like.

The following examples illustrate the invention.

Example 1

A suspension of 12 grams of dried lead tetraacetate and 4 grams of calcium carbonate in 500 cc. of cyclohexane is stirred and refluxed for 10 minutes. 1.4 grams of iodine and 2 grams of 11$\alpha$-hydroxy-3:17-dioxo-5$\alpha$-androstane are then added and the mixture is further heated at the boil with a 250 watt lamp. After 1 hour the color of iodine has disappeared almost completely. The suspension is cooled, the solid constituents are suctioned off and rinsed with ethyl acetate. The filtrates are washed with an aqueous solution of potassium iodide and sodium thiosulfate and then with water, dried and evaporated. The iodine-containing residue (2.91 grams) is dissolved in 50 cc. of glacial acetic acid and the solution is agitated below 20° C. for 20 minutes with several portions totalling 40 grams of zinc powder. The excess zinc powder is suctioned off and rinsed with acetone. The residue is taken up in ethyl acetate, the solution is washed with dilute hydrochloric acid and water, dried and evaporated under vacuum. The residue (1.97 grams) is chromatographed on 60 grams of alumina (activity II). The residue (150 mg.) of the evaporated benzene fractions is recrystallised from methylene chloride+isopropyl ether to furnish white needles which when heated decompose above about 200° C. and turn black. The infra-red spectrum of the compound in methylene chloride solution contains bands inter alia at 3.64 and 3.80$\mu$ (aldehyde), 5.74$\mu$ (5-ring ketone) and at 5.93 and 6.31$\mu$ ($\alpha\beta$-unsaturated ketone). Analysis reveals the presence of about 1 molecular proportion of iodine.

When the further benzene+acetone 1:9 fractions are evaporated and the residue (620 mg.) is recrystallised from methylene chloride+ether or acetone+isopropyl ether, there are obtained 420 mg. of pure $\Delta^1$-3:17-dioxo-1:11$\alpha$-oxido-5$\alpha$-androstene in the form of small prisms melting at 220–225° C. The infra-red spectrum in methylene chloride solution displays bands inter alia at 5.74$\mu$ (5-ring ketone), 6.11 and 6.30$\mu$ ($\alpha\beta$-unsaturated ketone) and at 8.53, 8.83 and 9.11$\mu$. The ultra-violet spectrum in rectified alcohol solution displays an absorption at 255 mμ (ε=17,700).

The further methylene chloride fractions of the chromatogram yield crystalline residues (total 530 mg.) which reveal in the infra-red spectrum in methylene chloride solution bands inter alia at 2.80μ (hydroxyl), 5.77μ (5-ring ketone) and at 5.86 and 6.00μ. Recrystallisation of the product from methylene chloride+isopropyl ether furnishes 300 mg. of impure crystals of $\Delta^1$-3:17-dioxo-11α-hydroxy-5α-androstene melting at 150–170° C. A solution of the compound in rectified alcohol displays in the ultra-violet spectrum an absorption at 231 mμ (ε=about 4000). When the subsequent acetone fractions are evaporated, they yield residues (170 mg.) which display in the infra-red spectrum the same principal bands as the residues from the methylene chloride fractions. Finally, the alumina is eluted with ether+glacial acetic acid 9:1. The evaporation residue obtained under vacuum is dissolved in ethyl acetate, washed with dilute hydrochloric acid and water, then with dilute sodium carbonate solution and water, dried and evaporated. The resulting residue (130 mg.) likewise displays in the infra-red spectrum the same principal bands as the residues from the methylene chloride fractions.

The above-mentioned iodine-containing residue obtained by the reaction may alternatively be chromatographed directly on alumina (activity II) before the treatment with zinc and glacial acetic acid, whereupon the identical, though slightly impure products are obtained which can then be separately subjected to the treatment with zinc and glacial acetic acid.

The iodine-containing crude residue from the reaction with lead tetracetate and iodine can be heated with 4 grams of anhydrous sodium acetate in dimethylformamide for 2 hours on a waterbath, whereupon the suspension is evaporated under vacuum, the residue is taken up in ethyl acetate, and the ethyl acetate solution is washed with dilute hydrochloric acid and water, dried, and evaporated under vacuum. The residue (2.18 grams) is then likewise subjected to chromatographic separation on alumina, and the identical products are obtained, but also in this case they are not so pure. The individual fractions can be subjected to the treatment with zinc and glacial acetic acid, whereupon purer products are obtained.

*Example 2*

A suspension of 12.0 grams of lead tetraacetate and 4.0 grams of calcium carbonate in 500 cc. of cyclohexane is stirred and heated for 10 minutes at 80° C. 1.40 grams of iodine and 2.00 grams of 3-oxo-11α-hydroxy-20-ethylenedioxy-5α-pregnane are then added, and the mixture is refluxed for 1 hour while being stirred and irradiated with a 250 watt lamp. The reaction mixture is cooled, filtered through Celite, the residue is rinsed with cyclohexane, and the combined filtrates are washed with 200 cc. of a sodium thiosulfate solution of 10% strength and with 3 x 150 cc. of water, dried with sodium sulfate and evaporated in vacuum. The pale yellowish crude product is dissolved in 10 cc. of a petroleum ether+benzene mixture 1:1 and then chromatographed on 30 times its own weight of neutral alumina (activity II).

Benzene and a 9:1-mixture of benzene and ethyl acetate elute 805 mg. of $\Delta^1$-3-oxo-20-ethylenedioxy-1:11α-oxido-5α-pregnene which, after recrystallization from methylene chloride+ether, melts at 177–178° C. Ultra-violet maximum at 255 mμ (ε=1800). The infra-red spectrum of the compound contains bands inter alia at 6.13, 6.31, 7.26, 7.52, 8.55, 8.75, 8.83, 9.10, 9.50, 10.55, 11.25, 11.65 and 11.90μ.

Benzene+ethyl acetate 4:1 elutes 300 mg. of pure $\Delta^1$-3-oxo-11α-hydroxy-20-ethylenedioxy-5α-pregnene melting at 221–222° C. Ultra-violet maximum at 231 mμ (ε=10,600). The infra-red spectrum contains absorption bands inter alia at 2.80, 6.00, 6.25, 7.31, 9.30, 9.45, 9.66, 9.80 and 10.55μ. When the compound in the form of a solution of 2% strength in acetic acid of 66% strength is heated for a short time and the reaction mixture is then worked up, $\Delta^1$-3:20-dioxo-11α-hydroxy-5α-pregnene is obtained.

*Example 3*

A suspension of 12 grams of dried lead tetraacetate and 4 grams of calcium carbonate in 700 cc. of cyclohexane is stirred and refluxed for 10 minutes. 1.4 grams of iodine and 2 grams of $\Delta^4$-3-oxo-11α-hydroxy-17β-acetoxy-17α-methyl-androstene are then added and the mixture is further heated to the boil with a 250 watt lamp. After 30 minutes the color of iodine has disappeared. The suspension is cooled, the solid constituents are suctioned off and rinsed with ethyl acetate. The filtrates are then washed with an aqueous solution of potassium iodide and sodium thiosulfate and then with water, dried and evaporated. The iodine containing residue (2.66 grams) is dissolved in 50 cc. of glacial acetic acid and the solution is agitated below 20° C. for 20 minutes with several portions totalling 40 grams of zinc powder. The excess zinc powder is suctioned off and rinsed with acetone. The solution is then evaporated in vacuum. The residue is taken up in ethyl acetate, the solution is washed with dilute hydrochloric acid and water, dried and evaporated under vacuum.

The residue (2.34 grams) is chromatographed on 60 grams of alumina (activity II). The residue (330 mg.) of the evaporated ether fractions is recrystallized from ether and subsequently from methanol and there are thus obtained 140 mg. of sharp platelets of the $\Delta^{1,4}$-3-oxo-1,11α-oxido-17α-methyl-17β-acetoxy-androstadiene. They melt at 250–258° C., $[\alpha]_D^{25}=+85°$ (in chloroform). The infra-red spectrum of the compound in methylene chloride solution contains characteristic bands inter alia at 5.77μ and 8.10μ (acetate), 6.01μ and 6.19μ (α,β-unsaturated ketone) and at 8.77μ and 8.85μ. If the above acetate is refluxed for 2 hours in methanolic sodium hydroxide solution there is obtained the $\Delta^{1,4}$-3-oxo-1,11α-oxido-17β-hydroxy-17α-methyl androstadiene.

When the further methylene-chloride fractions are evaporated and the residue (1020 mg.) is recrystallized from methylene-chloride-ether there are obtained 380 mg., $\Delta^{1,4}$-3-oxo-11α-hydroxy - 17α - methyl - 17β - acetoxy-androstadiene in the form of needles melting at 175–176° C. $[\alpha]_D^{25}=-12°$ (in chloroform). In the infra red spectrum in methylene chloride there are characteristic bands inter alia at 2.78μ (hydroxyl), 5.79μ and 8.12μ (acetate), 6.01μ, 6.16μ and 6.24μ (α,β-unsaturated ketone) as well as at 7.30μ.

What is claimed is:

1. Process for the manufacture of a member selected from the group consisting of $\Delta^1$-1:11α-oxido steroids, and $\Delta^1$-11α-hydroxy steroids consisting in treating an 11α-hydroxy-steroid which is both unsubstituted and saturated in the 1-position with compounds forming monovalent positive iodine.

2. Process as claimed in claim 1, wherein the 11α-hydroxy-steroid is treated with lead tetraacetate and iodine.

3. Process as claimed in claim 1, wherein the 11α-hydroxy-steroid is treated with a member selected from the group consisting of an N-iodo-carboxylic acid amide and an N-iodo-carboxylic acid imide.

4. Process as claimed in claim 1, wherein the 11α-hydroxy-steroid is treated with an acyl-hypoiodite.

5. Process as claimed in claim 1, wherein the 11α-hydroxy-steroid is treated with a silver acylate and iodine.

6. Process as claimed in claim 1, wherein the 11α-hydroxy-steroid is treated with a mercuric diacylate and iodine.

7. Process as claimed in claim 2, wherein the reaction is conducted in a solvent selected from the group consisting of an alicyclic hydrocarbon and a halogenated hydrocarbon.

8. Process as claimed in claim 1, wherein cyclohexane is used as solvent.

9. A member selected from the group consisting of a compound of the formula

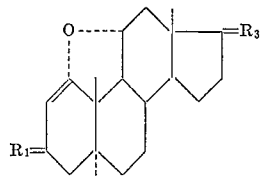

wherein $R_1$ is a member selected from the group consisting of an oxo group and a ketalized oxo group, $R_3$ is a member selected from the group consisting of an oxo group, a β-hydroxyl group and a β-acyloxy group together with a member selected from the group consisting of a hydrogen atom and a lower aliphatic hydrocarbon residue, a β-acetyl, a free and esterified β-hydroxy-acetyl group together with a member selected from the group consisting of a hydrogen atom, a free hydroxyl group and an esterified hydroxyl group, and a corresponding 5β-isomer and derivatives of these compounds having a 4:5 double bond.

10. $\Delta^1$-3-17-di-oxo-1,11α-oxido-5α-androstene.
11. $\Delta^1$-3-oxo-17β-hydroxy-1,11α-oxido-5α-androstene.
12. $\Delta^1$-3-oxo-1,11α-oxido-17β-hydroxy-17α-lower alkyl-5α-androstene.
13. $\Delta^1$-3-oxo-17β-hydroxy - 1,11α - oxido-17α-methyl-5α-androstene.
14. $\Delta^{1,4}$-3-oxo-1,11α-oxido - 17α - methyl-17β-acetoxy-androstadiene.
15. $\Delta^{1,4}$-3-oxo-1,11α-oxido - 17α - methyl-17β-hydroxy-androstadiene.
16. $\Delta^1$-3,20-dioxo-1,11α-oxido-5α-pregnene.
17. The 20-monoketal of the compound of claim 16.
18. $\Delta^{1,4}$-3-oxo-1,11α-oxido-pregnadiene.

References Cited by the Examiner

Kalvoda et al.: Helv. Chim. Acta, vol. 44, pp. 186–198 (1961).

Zurcher et al.: Helv. Chim. Acta, vol. 44, pp. 198–206 (1961).

LEWIS GOTTS, *Primary Examiner.*